United States Patent

Otsuki

[11] Patent Number: 5,532,843
[45] Date of Patent: Jul. 2, 1996

[54] PARALLEL PROCESSING APPARATUS BASED ON ARBITRARY DETERMINATION OF PROCESSING AREAS OF IMAGE DATA

[75] Inventor: Akira Otsuki, Matsudo, Japan

[73] Assignees: Fujikura Ltd.; FMT Ltd., both of Tokyo, Japan

[21] Appl. No.: 220,701

[22] Filed: Mar. 31, 1994

[30] Foreign Application Priority Data

Apr. 8, 1993 [JP] Japan .................................. 5-082248

[51] Int. Cl.$^6$ .......................... H04N 1/387; H04N 1/40; H04N 1/46; G06K 9/40
[52] U.S. Cl. .................. 358/453; 358/452; 358/448; 358/462; 358/538; 382/176; 382/304
[58] Field of Search ..................... 358/452, 453, 358/448, 462, 463, 538; 382/54, 303, 304, 176

[56] References Cited

U.S. PATENT DOCUMENTS

| | | | |
|---|---|---|---|
| 4,984,283 | 1/1991 | Sakano | 358/456 |
| 5,140,440 | 8/1992 | Sasaki | 358/453 |
| 5,351,138 | 9/1994 | Sasaki et al. | 358/462 |
| 5,465,307 | 11/1995 | Azumaya et al. | 382/304 |

FOREIGN PATENT DOCUMENTS 0416421  3/1991  European Pat. Off. .

*Primary Examiner*—Edward L. Coles, Sr.
*Assistant Examiner*—Kimberly A. Williams
*Attorney, Agent, or Firm*—Oblon, Spivak, McClelland, Maier & Neustadt

[57] ABSTRACT

When determining areas, a data for determining area Ds, including bit data $D_0$ which shows whether the area to be processed or not, is stored in a frame memory for determining area 5. When carrying out image processing, the frame memory 5 outputs the data Ds in synchronization with the output of image data D form a A/D converter 3. A gate 4 outputs the image data D only when the bit data $D_0$ is a value [1] representing the area to be processed. In Synchronization with the output of the data D, bit sequence $D_1 \sim D_n$ is output as the additional data regarding to the area. In an image processing system(not shown), although the image processing is carried out for the whole of a frame memory, the image data D is not supplied except for the area shown by the bit data $D_0$ so as not to be carried out the image processing. Therefore, only for the area shown by the bit data $D_0$, the image processing is carried out in accordance with the bit sequence $D_1 \sim D_n$.

3 Claims, 4 Drawing Sheets

Continued to necessary number of bits for example
$d_0$ : Area setting bit
$d_1\sim$ : Area code number
$d_\ell\sim$ : Threshold level of the area
$d_m\sim$ : Sampling numbers of the frame
$d_n\sim$ : Sampling period of the frame
⋮
$d_p$ : Necessary operation/control bit to be adapted to the pixel of the area (for instance Fourier Transform etc.)
⋮
etc.

PARALLEL PROCESSING APPARATUS BASED ON ARBITRARY DETERMINATION OF PROCESSING AREAS OF IMAGE DATA

BACKGROUND OF THE INVENTION

1. Field of the Invention

The present invention relates to an apparatus for determining image area to be processed when the image processing is carried out for image data.

2. Background Art

The image processing is well known, such as equalization or Fourier transform for image data stored in a frame memory of a computer. In the image processing, if it is necessary to carry out the image processing for a part of an image, for example, the object area is defined by assigning its address in a frame memory or by giving an equation representing its circumference. Then, the area is calculated on the basis of the above memory address or equation, and the process is carried out only for the area.

In the above mentioned method for determining image areas, it needs a very long time for determining the areas in comparison with the time for processing the image data. Therefore, the process for determining area cannot catch up with the image processing in case the image processing is carried out in real time for the object moving quickly compared with the time for determining area.

Furthermore, in case of determining a plurality of areas in one frame or carrying out a different process for each area, it becomes difficult to carry out the real time processing because the more complex calculation is required.

SUMMARY OF THE INVENTION

The object of the invention is therefore to provide an apparatus for determining image processing area which makes it possible to set image area for each pixel easily, to reduce the burden of the calculation to a large degree even if a plurality of areas are set in one frame, and to control processing for each pixel.

In order to resolve the aforementioned problems, the invention is directed to an apparatus for determining an image processing area, including:

an image data outputting means for outputting image data consisting of pixels sequentially for each frame;

an area setting memory which stores a distinction code/data in order to distinguish the areas to be processed from the other areas for each pixel in one frame, and outputs said distinction code/data in synchronization with the output of said image data;

a gate means which is supplied with said image data and said distinction code/data, and outputs said image data only when said distinction code/data shows that the area is to be processed.

in the present invention, the distinction code/data for each pixel, which shows whether the pixel is included in the area to be processed or not, is stored in the area setting memory previously. The distinction code/data is output form the area setting memory in synchronization with the image data output from the image data outputting means. Then, the gate means outputs the image data only in case the distinction code/data shows that the pixel is included in the area to be processed. Therefore, it is possible to set image area for each pixel easily, to reduce the burden of the calculation to a large degree even if a plurality of areas are set in one frame, and to control necessary and predetermined processing for each pixel. As a result, even if a plurality of areas are set In one picture, it is possible to carry out the Image processing in real time for each area.

DETAILED DESCRIPTION OF THE PREFERRED EMBODIMENTS

Figure 1:
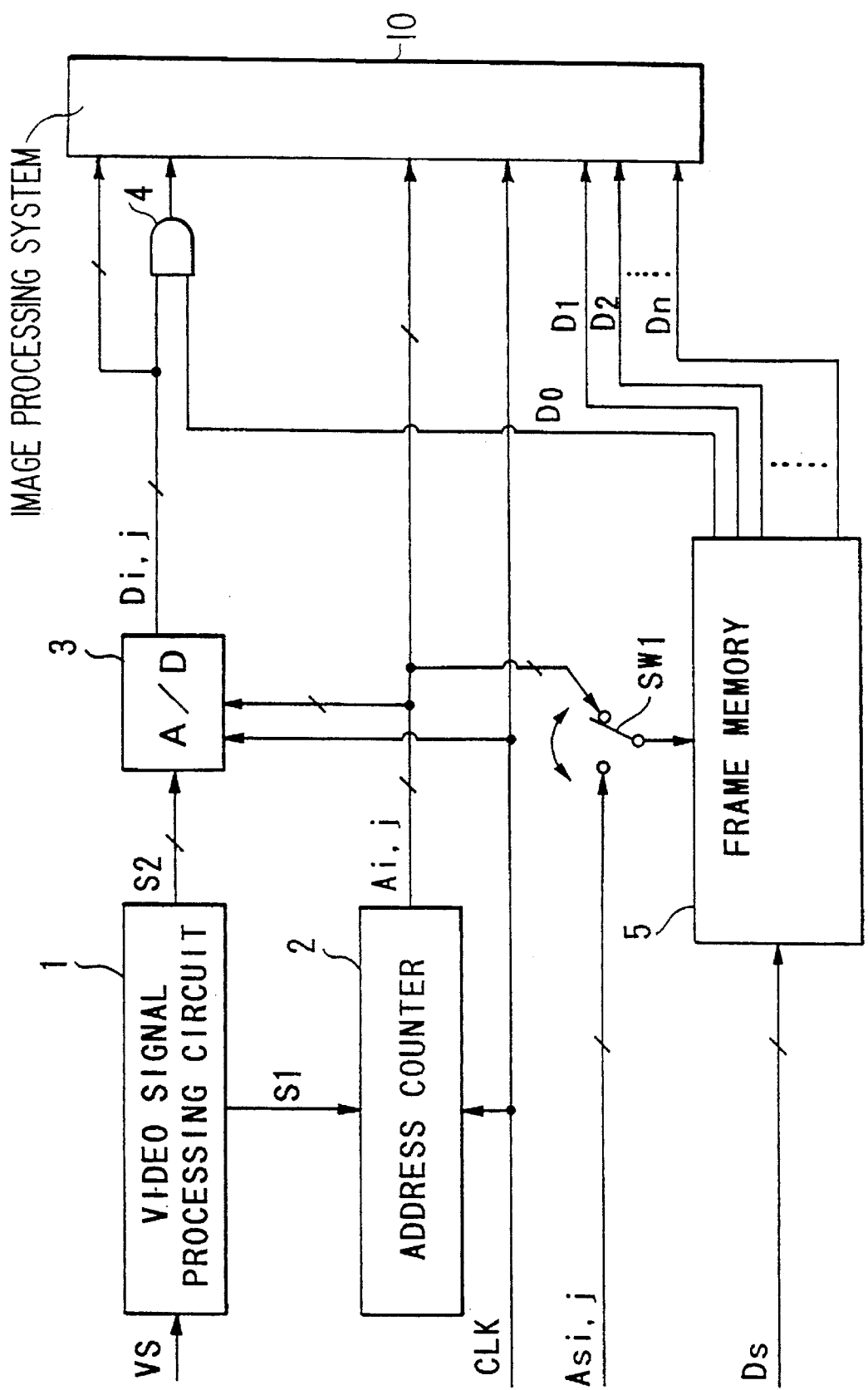
FIG. 1 is a block diagram showing a structure of an embodiment of the present invention.

Hereinafter, a preferred embodiment of the present invention will be explained with reference to the figures. FIG. 1 is a block diagram showing a structure of an embodiment of an apparatus for determining image processing area according to the present invention. A video signal processing circuit 1 divides a video signal VS, which represents the image recorded by a video camera(not shown), into a synchronization signal S1 and an image signal S2, and outputs the synchronization signal S1 to an address counter 2, and outputs the image signal S2 to an A/D(analog/digital) convertor 3. The address counter 2 generates address data $A_{ij}$(i:the horizontal address, J:the vertical address) of a frame memory(for one frame) in accordance with a clock signal CLK, and outputs the data $A_{ij}$ to the A/D convertor 3, an address change-over switch SW1 and a subsequent image processing system 10.

The A/D convertor 3 converts the image signal S2 into the image data which consists of digital data $D_{00}$~$D_{ij}$(i.e., image data D) for each pixel, in accordance with the clock signal CLK and the address data $A_{ij}$, and outputs the image data to one of input terminals of a gate 4 and to a monitor(not shown). The monitor displays the recorded image by a full picture on the screen at all times.

A frame memory 5 for determining image area is supplied with either the address data $A_{ij}$ or the area determining address data $As_{ij}$(i:the horizontal address, j:the vertical address) and with the area determining data Ds, via the address change-over switch SW1. The data Ds is data for representing areas to be processed, and is stored in the frame memory 5(refer to FIG. 4). While in the time of determining the data Ds, the address data $As_{ij}$ is supplied to the frame memory 5 via the switch SW1, after that, the address data $A_{ij}$ is supplied to the frame memory 5 via the switch SW1.

The frame memory 5 has the same address structure with a frame memory on which the display processing or the image processing is carried out. In the frame memory 5, the information for each pixel is represented by a plurality of bit sequence Dk(for example, in the case of 16 bits, $D_0$~$D_{15}$). In this embodiment, the least significant bit $D_0$ represents that area is whether to be processed or not to be processed(i.e., the real area or the wrong area), and the other bits $D_1$~$D_n$ represent the additional information which shows various parameters for image processing.

Next, with reference being made to FIG. 2, the method for assigning whether the real area or the wrong area in one frame will now be explained.

Figure 2:
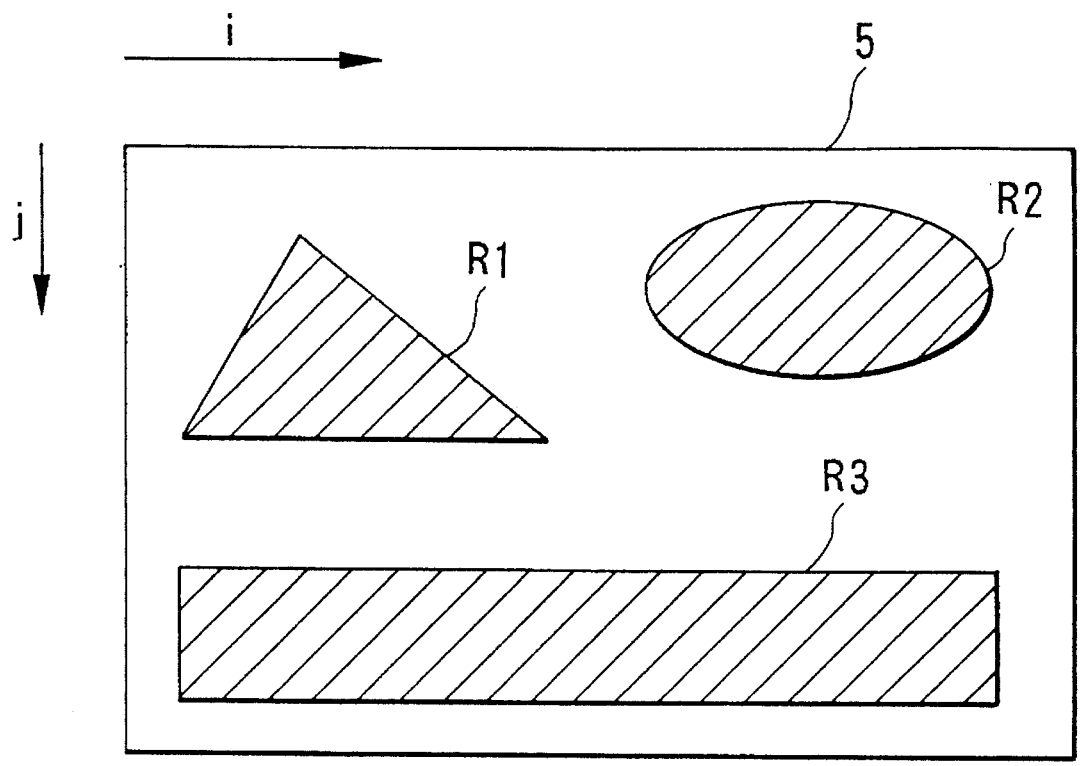
FIG. 2 is a two dimensional conceptual diagram showing a frame memory for determining image areas of the embodiment.

FIG. 2 is a two dimensional conceptual diagram showing a frame memory 5 for determining image area. In this figure, code i is the horizontal address and code j is the vertical address in the frame memory 5. These codes i,j correspond to the horizontal address i and the vertical address j of the address data $A_{ij}$ or the address data $As_{ij}$ respectively. The shading areas R1,R2,R3 represent the areas to be processed. These areas R1,R2,R3 are distinguished from the other areas for instance by assigning a value [1] to the pixels of the addresses in the shading areas, and by assigning a value [0] to the pixels of the addresses in the other areas. That ls to say, the value [1] is stored in the areas R1,R2,R3 and the value [0] is stored in the other areas. Of course If the logical operation is the negative true logic, the value [0] is stored in the areas R1,R2,R3 and the value [1] is stored in the other areas in accordance with the logic type of the processing system.

Figure 4:
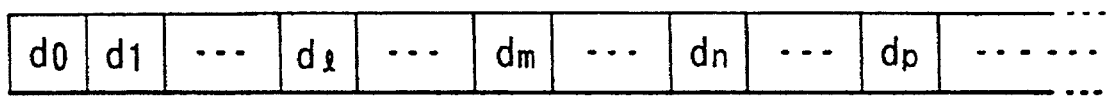
FIG. 4 is a typical example of distinction code/data preliminary determined and stored in the area setting memory.

As shown in FIG. 4, the above other bit sequence $D_1$~$D_n$ are used for representing various information which assigns the kind of process to be carried out, the pixel address to be processed, the sampling period for the object pixel, the sampling frame number, and so on. In this embodiment, there are bit sequence $D_1$~$D_n$ for each pixel so as to be able to process for each pixel. Actually, the Information, which shows carrying out different process for each pixel, for example, setting a binary threshold in the areas R1,R2,R3, indicating to carry out equalizing or indicating to carry out Fourier transform to the area R2, ls assigned to the bit sequence $D_1$~$D_n$ There are some methods in order to supply the data Ds for determining areas. For example, it is able to input areas to be processed as binary data to the computer by drawing them on the screen of another computer with a pointing device such as a mouse, a track ball, a Joy stick, a digitizer, and so on. It is also able to input a picture of the areas to be processed, which is drawn on the sheet, to the computer by scanner. Furthermore, it is also able to designate coordinates or addresses of the areas to be processed directly by a keyboard or the other switches such as a DIP switch.

After inputting the data Ds for determining areas, as described above, the address data $A_{ij}$ is supplied to the frame memory 5 via the address change-over switch SW1. Then, the frame memory 5 supplies the bit data $D_0$ for each pixel to one of the terminals of the gate 4 as bit data for determining area, and output the bit sequence $D_1$~$D_n$ to the image processing system(not shown) as the additional information. The gate 4 is opened and outputs the image data D to the subsequent image processing system only when the above bit data $D_0$ is the value [1].

Next, an explanation will be made of the operation of the apparatus for determining image processing area according to the above described structure.

At first, the operation when determining areas will be explained. When determining areas, the address data for setting area $As_{ij}$ is supplied to the frame memory 5 via the address change-over switch SW1. The data Ds for determining areas, including the bit data $D_0$([1]/[0]) which represents whether each pixel is in the areas to be processed or not to be processed(i.e., the right area or the wrong area), is stored in the frame memory 5 by accessing sequentially to the address of the frame memory 5 by a certain means. This data Ds, especially the bit data $D_0$, as described above, is able to be input collectively by drawing the areas to be processed by a pointing device or by scanning a picture of the areas to be processed drawn on a sheet.

After determining areas as described above, next, the address change-over switch SW1 is switched so that the address data $A_{ij}$ is supplied to the frame memory 5. The video signal VS recorded by a video camera is supplied to the video signal processing circuit 1, and is divided into the synchronization signal S1 and the image signal S2. The address counter 2 generates the address signal $A_{ij}$ in order to access to the frame memory 5, in accordance with the synchronization signal S1 and the clock signal CLK, and supplies the signal $A_{ij}$ to the A/D converter 3 and the image processing system. The A/D converter 3 converts the image signal S2 to the image data D in bits, in accordance with the address signal $A_{ij}$ and the clock signal CLK, and supplies the data D to the gate 4.

The address data $A_{ij}$ is supplied to the frame memory 5 via the switch SW1. Then, the frame memory 5 outputs the data for determining areas Ds, in synchronization with the image data D output by the A/D converter 3. The gate 4 outputs the image data D only in case the bit data $D_0$ of the data Ds is the value [1](i.e. the right area). That is to say, only the image data D of the areas, in which the bit data $D_0$ is the value [1], are output. The image data D of the set areas are output, and, in synchronization with this output, the bit sequence $D_1$~$D_n$ are output as the information regarding to the areas.

In the image processing system(not shown), the image processing is carried out to the whole of the frame memory. On the one hand, in the other areas where the bit data is not the value [1], the image data D is not supplied to the image processing system so that the image processing is not carried out. On the other hand, in the areas where the bit data is the value [1], the image processing is carried out in accordance with the information represented by the bit sequence $D_1$~$D_n$.

Next, with reference being made to the FIG. 3, one of variations of the above described embodiment will now be explained.

Figure 3:
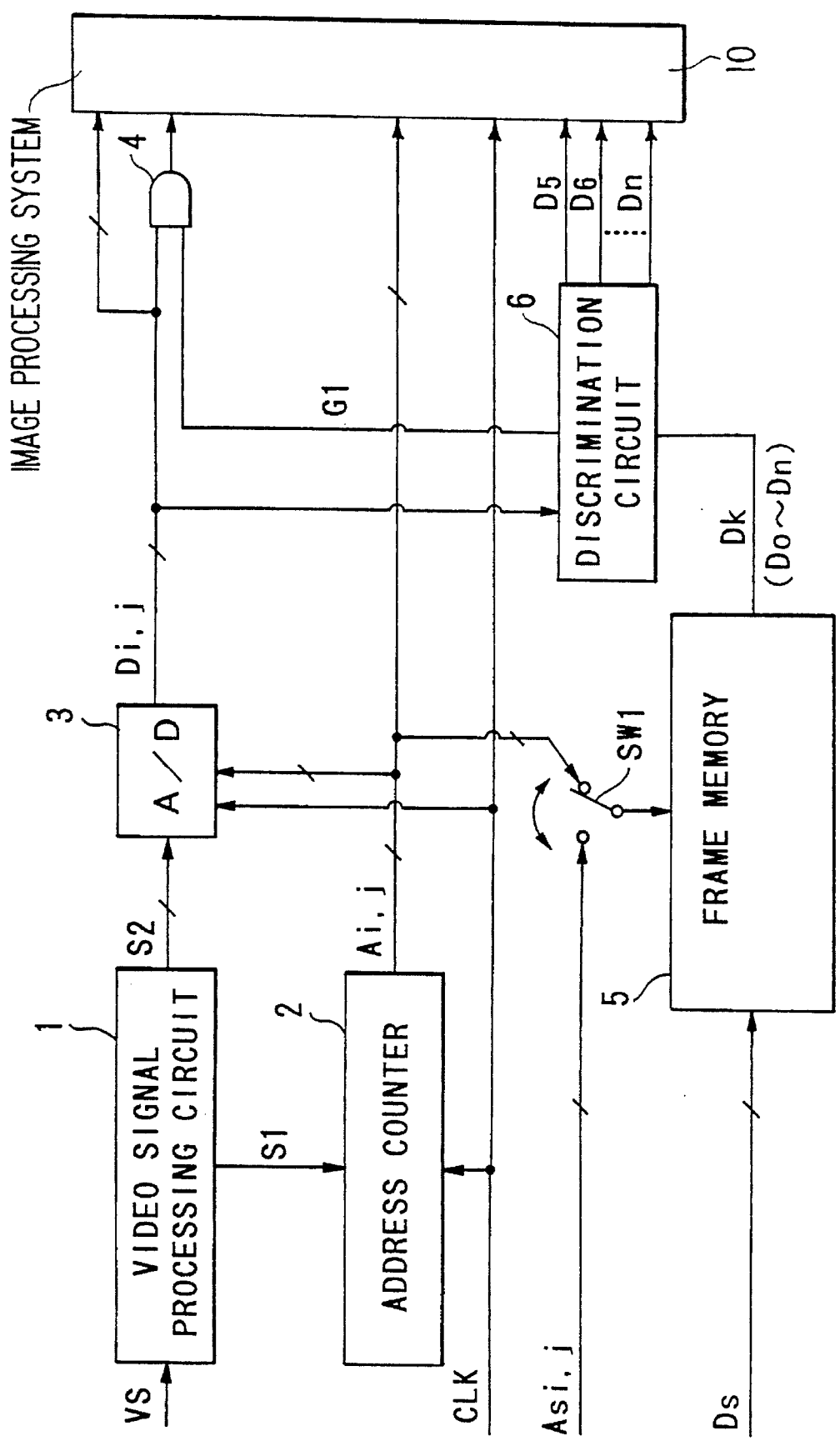
FIG. 3 is a block diagram showing the structure of one of deformations of the embodiment.

FIG. 3 is a block diagram showing the structure of one of variations of the above embodiment. In this figure, the components, which are the same components as shown in the FIG. 1, are represented by the same designations as shown in the FIG. 1, and will not be explained. In the FIG. 3, a discrimination circuit 6 carries out logic operation to the bit sequence $D_k$($D_1$~$D_n$) output by the frame memory 5, and outputs various control signals(refer to FIG. 4). The bit sequence $D_k$ is divided into some groups consisting of one bit or a plurality of bits. Each group has the meaning corresponding to the above processing control signal respectively. The logic operation is carried out between these groups. For example, as the first group, a certain bit (ex., the least significant bit $D_0$) is assigned to a bit for determining areas which decides whether the object area ls the real area or the wrong area. As the second group, the other four bits (ex., $D_1$~$D_4$) are assigned to a bit sequence which represents a threshold value used when the Image data is output to the image processing system. Furthermore, the other bits(ex., $D_5$~$D_n$) are assigned to an additional information which is output to the image processing system in synchronization with the output of the image data.

Therefore, in the logic operation of the discrimination circuit 6, it is possible to turn the gate opening signal G1 to the level [1] in order to open the gate 4 so as to output the image data D to the image processing system if the above bit for determining areas is the value [1] and the gradation level of the image data D output by A/D converter 3 is higher than the above threshold value. In the image processing system, as described above, although the image processing is carried out for the whole of the frame memory, no processing is carried out for the areas which is not supplied with the image data D. That is to say, as a result, the image processing is carried out only for the areas which is supplied the image data D. Therefore, in the image processing system, there is no need to process with regard to the determining areas. In other words, only the conventional image processing is carried out for one frame in the system. Then, it is possible to reduce the burden in the image processing system compared with the method for determining areas of the prior art.

By the way, the above described apparatus for determining image processing area ls advantageously applied to an apparatus for detecting a moving object making use of the image processing. The apparatus for detecting a moving object detects the object image that moves in a screen (i.e., one frame) or changes the contrast. Then, it is necessary to decide the sampling period or the sampling frame number of the image data corresponding to the moving speed of the object or the changing speed of the contrast on the screen. It is easy to decide the sampling period or the sampling frame number if it is already known that the object moves or changes only in a certain area of the screen and the moving or changing speed is in a certain range. That is to say, it is enough to decide only one parameter for the whole of the frame.

However, in the method for determining areas of the prior art, the operation is complex and it is impossible to process in real time, in case of detecting the object image which moves or changes in each area of a plurality of areas in a screen at a different speed respectively. Then, in the apparatus for determining image processing area according to the present Invention, it is possible to set the sampling period, the sampling frame number, and so on, for each area(in practice, for each pixel) to be processed as the additional information represented by bit sequence. Therefore, in the side of detection for the moving object. It is enough to carry out the image processing for the image data supplied sequentially, in accordance with the sampling period, the sampling frame number, and so on, and to detect the moving object in each area.

For example, in case, in a screen having an air area and a sea area, a flying object moves quickly in the air area on the one hand, and a cruising object moves slowly in the sea area on the other hand, it is able to set the air area and the sea area as areas to be processed respectively, and to set the sampling period short in the air area on the one hand, and to set it long in the sea area on the other hand.

Additionally, while in the preceding embodiment the video signal VS is supplied from a video camera(not shown), it is not limited thereto. It is also able to use the output of a video tape recorder or a laser disc player as the video signal.

Further, while in the preceding embodiment the image data D is given from the video signal VS, it is not limited thereto. It is also able to supply the image data to the gate 4 directly.

Still further, while In the preceding embodiment the value [1] is assigned to the areas to be processed and the value [0] is assigned to the areas not to be processed in order to distinguish each areas on the frame memory 5, it is also able to assign the value [0] to the areas to be processed and to assign the value [1] to the areas not to be processed in case of negative logic circuit.

What is claimed is:

1. A parallel processing apparatus based on arbitrary determination of processing areas consisting of pixels, comprising:

an image data outputting means for outputting image data sequentially for each frame;

an area setting memory which stores a distinction code/data in order to distinguish the areas to be processed from the other areas for each pixel in one frame, and outputs said distinction code/data in synchronization with the output of said image data;

a gate means which is supplied with said image data and said distinction code/data, and outputs said image data only when said distinction code/data shows that the area is to be processed;

wherein the area setting memory stores on a pixel-by-pixel basis a parameter defining image processing to be performed on each respective pixel in one frame of image data as additional information, and outputs said additional information on a pixel-by-pixel basis in synchronization with outputting said distinction code/data to define processing to be performed on each respective pixel as said each respective pixel is output by said image data outputting means; and a parallel processing means for performing each process indicated by the additional information.

2. An apparatus for determining image processing area according to claim 1, wherein said distinction code/data is represented by one bit data.

3. An apparatus for determining image processing area according to claim 1, wherein said distinction code/data is represented by one bit data, and said parameter is represented by a bit sequence data.

* * * * *